US012403373B2

(12) United States Patent
Nguyen et al.

(10) Patent No.: US 12,403,373 B2
(45) Date of Patent: Sep. 2, 2025

(54) DETECTING OBJECTS PROXIMATE TO A TREADMILL

(71) Applicant: Peloton Interactive, Inc., New York, NY (US)

(72) Inventors: Jody Nguyen, New York, NY (US); Alvin Dominguez, New York, NY (US); Spike Cheng, Taipei (TW); Tobey Hsu, Taipei (TW)

(73) Assignee: Peloton Interactive, Inc., New York, NY (US)

( * ) Notice: Subject to any disclaimer, the term of this patent is extended or adjusted under 35 U.S.C. 154(b) by 230 days.

(21) Appl. No.: 17/737,716

(22) Filed: May 5, 2022

(65) Prior Publication Data

US 2022/0355179 A1    Nov. 10, 2022

Related U.S. Application Data

(60) Provisional application No. 63/184,635, filed on May 5, 2021.

(51) Int. Cl.
*A63B 71/00* (2006.01)
*A63B 22/02* (2006.01)
(Continued)

(52) U.S. Cl.
CPC .......... *A63B 71/0054* (2013.01); *A63B 22/02* (2013.01); *A63B 24/0087* (2013.01);
(Continued)

(58) Field of Classification Search
CPC .......... A63B 2220/13; A63B 2220/803; A63B 2220/833; A63B 69/0028; A63B 24/0087;
(Continued)

(56) References Cited

U.S. PATENT DOCUMENTS 7,713,172 B2 * 5/2010 Watterson .......... A63B 71/0622
482/4
11,738,250 B2 * 8/2023 Liao .................. A63B 24/0087
482/7

(Continued)

FOREIGN PATENT DOCUMENTS

GB       2467359 A  *  8/2010 ......... A63B 71/0054

*Primary Examiner* — Megan Anderson
*Assistant Examiner* — Jonathan A Dicuia
(74) *Attorney, Agent, or Firm* — AMPACC Law Group, PLLC

(57) ABSTRACT

An exercise machine can include sensors to detect objects proximate to and/or moving towards the exercise machine. For example, a treadmill, or a control system associated with the treadmill, can determine an object is moving towards or is already proximate to a deck of the treadmill (e.g., a front area, middle area, or rear area of the deck of the treadmill) and modify operations of the treadmill in response to the determined or detected object or object movement. The treadmill can utilize various detection mechanisms when determining an object is within a proximity to the treadmill, such as time-of-flight (ToF) sensors or cameras, millimeter wave (mmWave) sensors, computer vision (CV) technology, and so on, to detect the proximity of the object (or movement of the object).

9 Claims, 8 Drawing Sheets

(51) Int. Cl.
  *A63B 24/00*  (2006.01)
  *G01S 13/62*  (2006.01)
  *G01S 13/86*  (2006.01)

(52) U.S. Cl.
  CPC ....... *A63B 2071/0081* (2013.01); *G01S 13/62* (2013.01); *G01S 13/867* (2013.01)

(58) Field of Classification Search
  CPC ............ A63B 22/02; A63B 2071/0081; A63B 71/0054
  See application file for complete search history.

(56) References Cited

U.S. PATENT DOCUMENTS

| | | | |
|---|---|---|---|
| 2016/0051859 A1* | 2/2016 | Nakashima | A63B 71/0054 482/4 |
| 2016/0375339 A1* | 12/2016 | Lee | A63B 71/0054 482/7 |
| 2017/0004631 A1* | 1/2017 | Yang | G09B 5/02 |
| 2017/0113096 A1* | 4/2017 | Yu | G06F 3/067 |
| 2019/0240540 A1* | 8/2019 | Wei | A63B 22/0235 |

* cited by examiner

DETECTING OBJECTS PROXIMATE TO A TREADMILL

CROSS REFERENCE TO RELATED APPLICATIONS

This application claims priority to U.S. Provisional Patent Application No. 63/184,635, filed on May 5, 2021, entitled DETECTING OBJECTS PROXIMATE TO A TREADMILL, which is hereby incorporated by reference in its entirety.

BACKGROUND

People perform various exercise activities on exercise machines, often within an indoor environment, such as their home, a gym or fitness club, a training facility, and so on. For example, people run on a treadmill or other exercise machine having a moving surface controlled by a motor. The moving surface, or running surface, upon which a person walks or runs moves over or around a deck or other supporting assembly. The moving surface can be a belt-based surface, a slat-based surface, or other type of surface that moves around the deck, enabling the person (e.g., a runner) to walk, jog, and/or run at different speeds or inclines.

As another example, people can exercise on other exercise machines, such as exercise bicycles, rowing machines, elliptical machines, and other machines that having moving parts, motors, flywheels, and/or other components that function to simulate or provide an exercise activity within the indoor environment.

BRIEF DESCRIPTION OF THE DRAWINGS

Embodiments of the present technology will be described and explained through the use of the accompanying drawings.

Figure 1A:
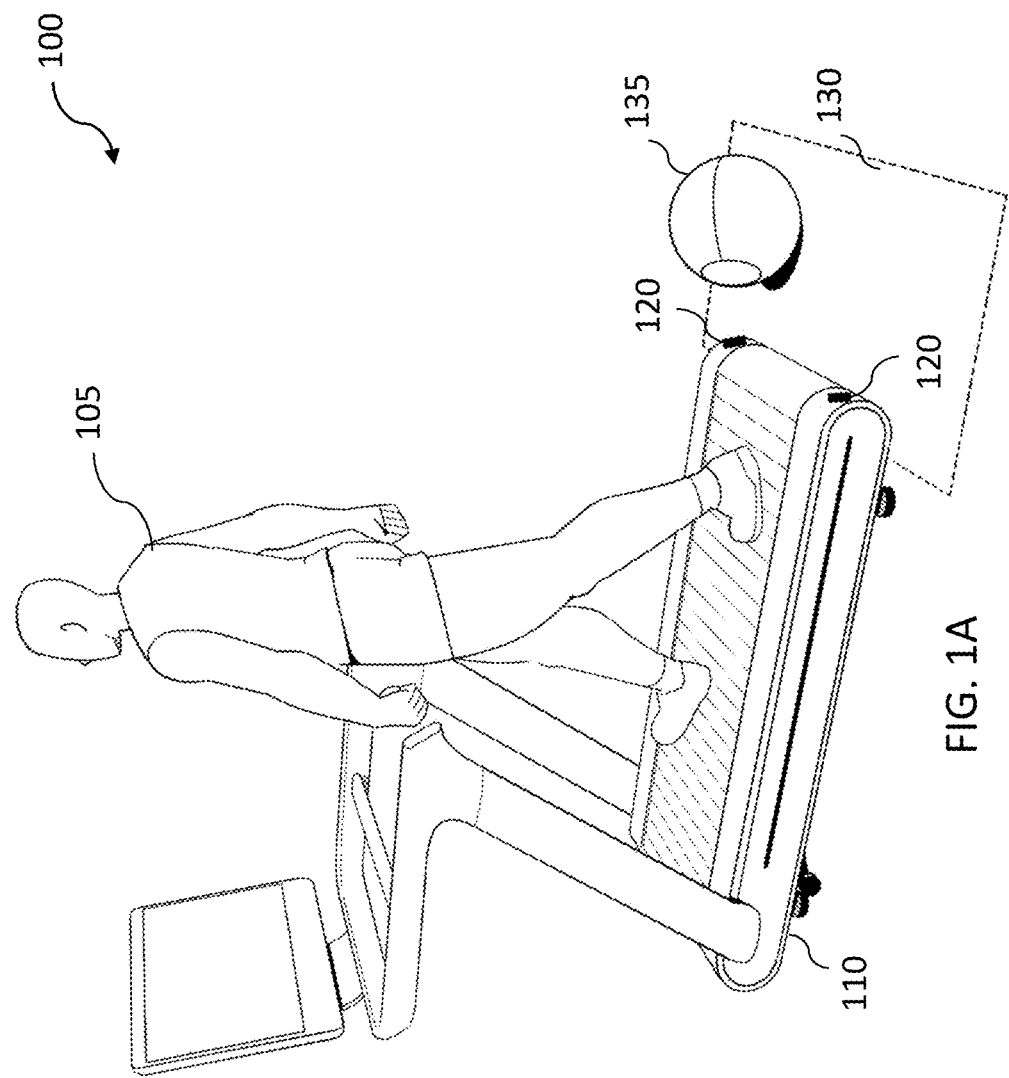
FIGS. 1A-1B are diagrams that illustrate an example scenario in which a treadmill detects an object within its proximity.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Various devices, systems and methods that enhance an exercise activity performed by a user are described. In some embodiments, the devices, systems, and methods perform operations to detect objects proximate to a treadmill, such as objects moving towards a rear area of a treadmill.

Often an exercise machine, such as a treadmill, is surrounded within a home or club environment by people, objects, pets, and so on. In some cases, these objects can move under or near the machine, leading to a potentially dangerous or sub-optimal condition for the object and/or a person operating the exercise machine. Thus, while basic protection mechanisms (e.g., a fixed guard) can provide some levels of protection, such mechanisms often fail to alert a user of the machine and/or adequately prevent the object from contacting or otherwise moving too close to the machine, among other issues.

In some embodiments, the various devices, systems, methods, and apparatuses utilize sensors to detect objects proximate to and/or moving towards a treadmill or other exercise machine, such as objects traveling towards an under area of a treadmill from a rear, side, or front area of the treadmill.

For example, the treadmill and/or a control system associated with the treadmill can determine an object is moving towards or is already proximate to a deck of the treadmill (e.g., a front area, middle area, or rear area of the deck of the treadmill) and modify operations of the treadmill in response to the determined or detected object or object movement. The treadmill can utilize various detection mechanisms when determining an object is within a proximity to the treadmill, such as time-of-flight (ToF) sensors or cameras, millimeter wave (mmWave) sensors, computer vision (CV) technology, and so on, to detect the proximity of the object (or movement of the object).

A controller or control system, in response to the object detection, can cause the treadmill to adjust a current operation (e.g., slow down or stop the moving belt or running surface) or otherwise perform a mitigation action to alert a user and/or prevent a dangerous condition at the treadmill due to the object's proximity and/or movement.

Thus, the treadmill, or other exercise machine, can enhance the experience of the user by modifying operations in response to the detected proximity or motion state of the object. The control system can receive a signal or other information that an object is traveling towards the treadmill (e.g., towards an under area of the treadmill) and cause the treadmill to slow down or shut off before the object progresses under the treadmill, among other benefits.

Various embodiments of the apparatuses, devices, systems, and methods will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of Detecting Objects Proximate to an Exercise Machine

The technology described herein is directed, in some embodiments, to utilizing object detection mechanisms (e.g., computer vision frameworks or models that detect objects within images, sensors that detect objects or movement of objects in an area) to determine whether objects are proximate to a treadmill or other exercise machine (e.g., exercise bicycle, rowing machine, and so on).

In some cases, the object detection mechanisms can detect objects proximate to a rear area of a treadmill, a side area of a treadmill, a front area of treadmill, and so on. Thus, the technology can be adapted to monitor a 360-degree perimeter or area surrounding a treadmill or other exercise machine. In doing so, the treadmill can detect objects proximate to the treadmill or machine and/or traveling towards an under area of the treadmill or machine, and provide warnings or perform other actions (e.g., slow down or stop the belt or surface of a treadmill) in response to the detection.

Figure 1B:
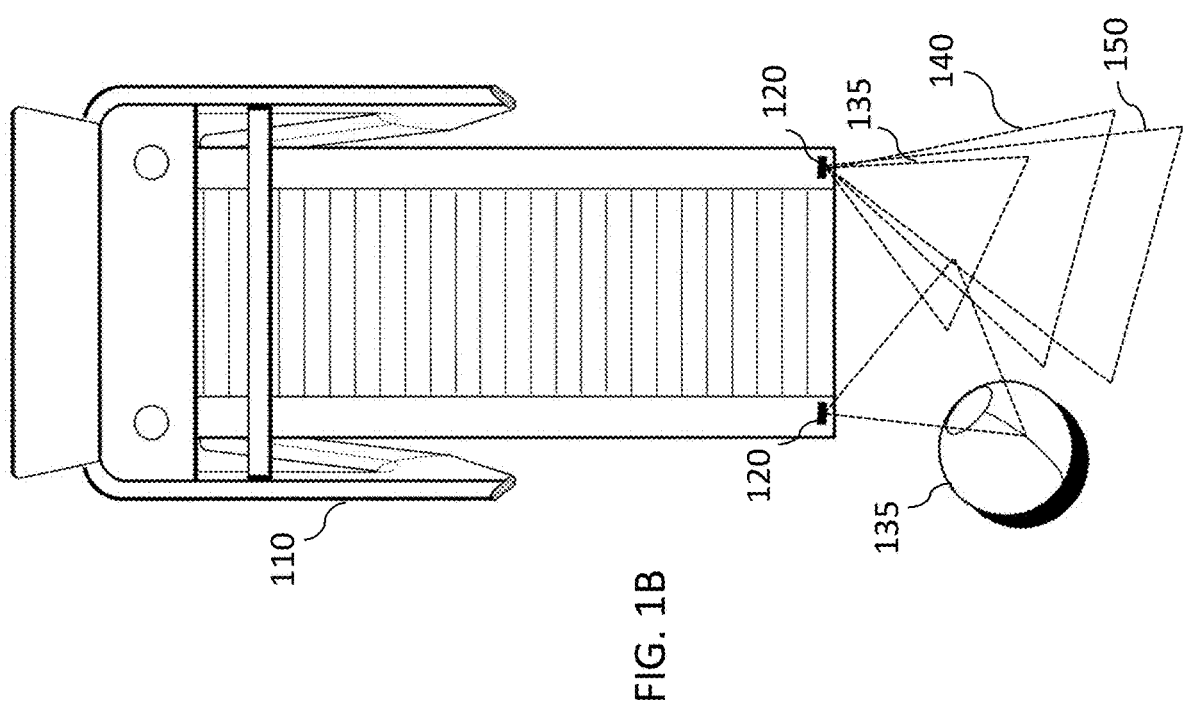

FIGS. 1A-1B depict an example detection scenario. A runner 105 ss exercising (e.g., running or walking) on a treadmill 100. The treadmill 100 monitors a rear proximity using object detection sensors 120 located on a deck 110 of the treadmill 100. For example, the sensors 120 are configured or positioned to monitor a rear area 130 having a certain area or width that extends behind the deck 110 of the treadmill 100.

When a ball 135 or other object (e.g., a pet, a toy, and so on), enters the rear area 130 monitored by the object detection sensors 120, the sensors 120 can detect the presence of the ball 135 and/or whether the ball is moving towards the deck 110 of the treadmill 100. In response to the detection, the treadmill 100, via an associated control system or safety system, can cause or trigger an alarm, warning, or notification that is presented to the runner 105 and/or shut down or slow the treadmill (via an associated safety controller or safety key mechanism).

In some cases, a monitored region can include multiple sub-regions, and the treadmill 100 can perform different actions that are based on the detection of objects within one or more of the sub-regions. For example, if a region has three sub-regions (as depicted in FIG. 1B), the sub-regions can each be associated with a different action. For example, a sub-region 150 farthest from the treadmill 100 can be associated with a warning presented to the runner 105, a closer sub-region 140 can be associated with a slowing of the treadmill 100, and an inner sub-region 135 closest to the treadmill (e.g., indicating an object is about to move under the treadmill) can be associated with a shutting down or other stop action performed by the treadmill 100.

The regions can be configured to different sizes, angles, and/or geometries. Further, one area proximate to the treadmill (e.g., a rear area) can have multiple sub-regions, whereas areas proximate to other sides of the treadmill (e.g., a front or side area) can have fewer sub-regions.

In addition to treadmills, the technology described herein can be employed by other exercise machines, such as exercise bicycles, rowing machines, strength machines, and so on. Further details regarding suitable treadmills or other exercise machines that can incorporate or utilize the technology described herein can be found in Appendix A, which is incorporated in its entirety herein.

As described herein, in some embodiments, an exercise machine, such as the treadmill 100, includes or is associated with a machine control system, which functions to control operations of the machine in response to detecting or identifying an object is within a proximity of the exercise machine.

Figure 2:
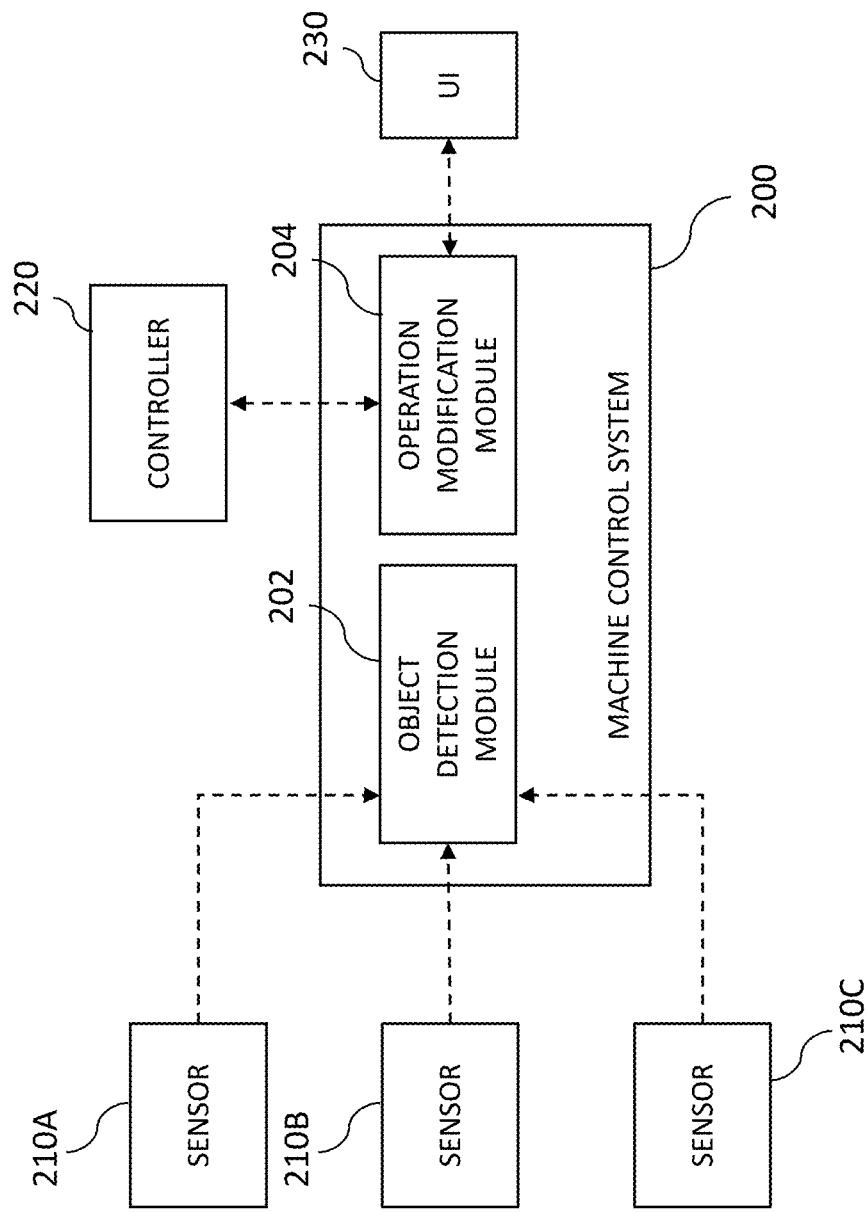
FIG. 2 is a block diagram illustrating components of a machine control system.

FIG. 2 is a block diagram illustrating components of a machine control system 200. The machine control system 200 can include one or more modules and/or components to perform one or more operations of the machine control system 200. The modules may be hardware, software, or a combination of hardware and software, and may be executed by one or more processors. For example, the system 200 may include an object detection module 202 and an operation modification module 204.

In some embodiments, the object detection module 202 is configured and/or programmed to detect an object is proximate to an exercise machine based on information captured by one or more sensors 210A-C monitoring an area surrounding the exercise machine. For example, the object detection module 202 can determine that the object is within a rear area of the exercise machine (e.g., the exercise machine 100) and/or determine that the object is moving towards a rear area of the exercise machine at a certain rate of speed and/or at a certain angle towards the machine.

As described herein, the one or more sensors 210A-C can detect objects utilizing different detection technologies or techniques. The machine control system 200 can detect objects using one or the techniques or various combinations of the techniques.

Detecting Objects Using Computer Vision (CV) Techniques—As described herein, the one or more sensors 210A-C can include CV cameras or sensors, which capture images of an area proximate to the exercise machine and identify objects within the images. The object detection module 202, upon receiving or accessing the images captured by CV sensors, can utilize a MOG2 technique, which employs a Gaussian Mixture-based Background/Foreground Segmentation Algorithm to model pixels within the captured images. The system can utilize other techniques (e.g., MOG, GMC, KNN, Frame Template, and so on).

The module 202, to detect an object, can draw or create a bounding box around an object, obtaining areas of interest via contours in the images to determine or calculate the box. The system can utilize various calibration techniques, such as OpenCV, to determine camera distortion coefficients and warp captured images, to obtain a top-down view or perspective of a monitored area. For example, the module 202 can rectify an image before detecting objects within the image and can filter during rectification before determining contours and overlays for objects within the captured images.

In addition to detecting the object is proximate to the exercise machine, the module 202, via the CV techniques, can determine a color or size of an object, a rate of speed of an object, a time within the region or area, or other characteristics of the object and its motion or movement towards the exercise machine. Thus, the CV techniques can provide a robust detection mechanism for the exercise machine, which can, in some cases, detect an object and identify the object or size of the object as being an object of concern.

Detecting Objects Using Millimeter Wave (mm Wave) Techniques—As described herein, the one or more sensors 210A-C can include mmWave sensors, which can detect a single object out of multiple objects within a field of view (FOV) of the sensors, as well as identify a movement or motion state of the object. The mmWave sensors utilize a Frequency Modulated Continuous Wave (FMCW) mechanism that transmits and receives chirps (e.g., waves at 60 Ghz or 24 Ghz) and can capture three dimensions of information (e.g., velocity, range or distance, and angle) for an object proximate to the exercise machine.

For example, the one or more sensors 210A-C can include a mmWave sensor array, where some of the sensors are transmitters (Tx) and some of the sensors are receivers (Rx). The Tx sensors transmit chirps, and the Rx sensors receive the chirps—where multiple chirps are utilized to detect the velocity of the object and multiple antennas (e.g., receivers) are utilized to detect the angle of movement of the object.

Various configurations of the mmWave sensors can be deployed or disposed to provide different levels of sensing granularity or detection areas. For example, a first configuration, which can detect multiple objects, can include multiple transmitters (e.g., three Txs) and multiple receivers (4 Rxs) with an operating frequency of 60 Ghz, having a detection angle of +/−65 degrees and a detection distance or range of 25 meters. As another example, a second configuration, which can detect a single object, can include one Tx and two Rxs, with an operating frequency of 24 Ghz, having a detection angle of +/−60 degrees and a detection distance or range of 8 meters. Of course, other configurations are possible.

Thus, the module 202 can receive different types of information and detect a location or range of an object and/or the motion state (e.g., velocity and angle) of the object.

Detecting Objects Using Time-Of-Flight (ToF) Techniques—As described herein, the one or more sensors 210A-C can include time-of-flight (ToF) sensors, which can detect a range or distance of a single object from an exercise machine. The ToF sensors emit laser pulses (e.g., IR or other pulses) and measures a time interval or duration for which the pulses reflect off an object and back to the sensor. While a detection plane of a pulse increases in size as the pulses travel, the sensors can accurately detect objects at distances up to 1.5 meters, and thus are suitable for detecting the location or position of an object near or proximate to an exercise machine.

In some cases, the ToF sensor or camera can be small, discrete (e.g., within a glass covering and protected), have a minimal ID interface, and/or be integrated various components of the exercise machine.

Thus, the module 202 can receive distance information from an object, and determine the object is within a certain area or proximity of the exercise machine. Further, using multiple detected locations, the module 202 can determine if the object is moving towards the machine and/or acceleration/decelerating with respect to the machine.

Of course, the module 202 can utilize various combinations of sensors and captured information, as described in greater detail herein. For example, the object detection module 202 can (1) receive information from a time-of-flight sensor that detects the object is within the area surrounding the exercise machine and (2) a computer vision (CV) sensor that determines the object detected to be within the area surrounding the exercise machine is moving towards the exercise machine and/or a millimeter wave (mmWave) sensor that determines the object detected to be within the area surrounding the exercise machine is moving towards the exercise machine.

In some embodiments, the operation modification module 204 is configured and/or programmed to modify a current operation of the exercise machine based on detecting the object is proximate to the exercise machine. For example, the operation modification module 204 can present a warning message or alert to a user via a user interface (UI) 230 or display of the exercise machine.

In some cases, the module 204 can perform an action to control a mechanical operation of the exercise machine, such as by transmitting instructions to a controller 220 or control system of the exercise machine. For example, when the exercise machine is a treadmill, the operation modification module 204 causes the controller 220 to slow or stop the movement of the running surface of the treadmill. As another example, when the exercise machine is an exercise bicycle, a rowing machine, or another machine with a flywheel or rotating disc, the module 204 causes the controller 220 to slow or stop the movement of the flywheel (e.g., apply a braking mechanism).

FIG. 2 and the components, modules, systems, servers, and devices depicted herein provide a general computing environment within which the technology described herein can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), or they may be provided on any analog or digital network (packet switched, circuit switched, or other scheme). Portions of the system may reside on a server computer, while corresponding portions may reside on a client computer such as an exercise machine, display device, or mobile or portable device, and thus, while certain hardware platforms are described herein, aspects of the system are equally applicable to nodes on a network. In some cases, the mobile device or portable device may represent the server portion, while the server may represent the client portion.

Figure 3:
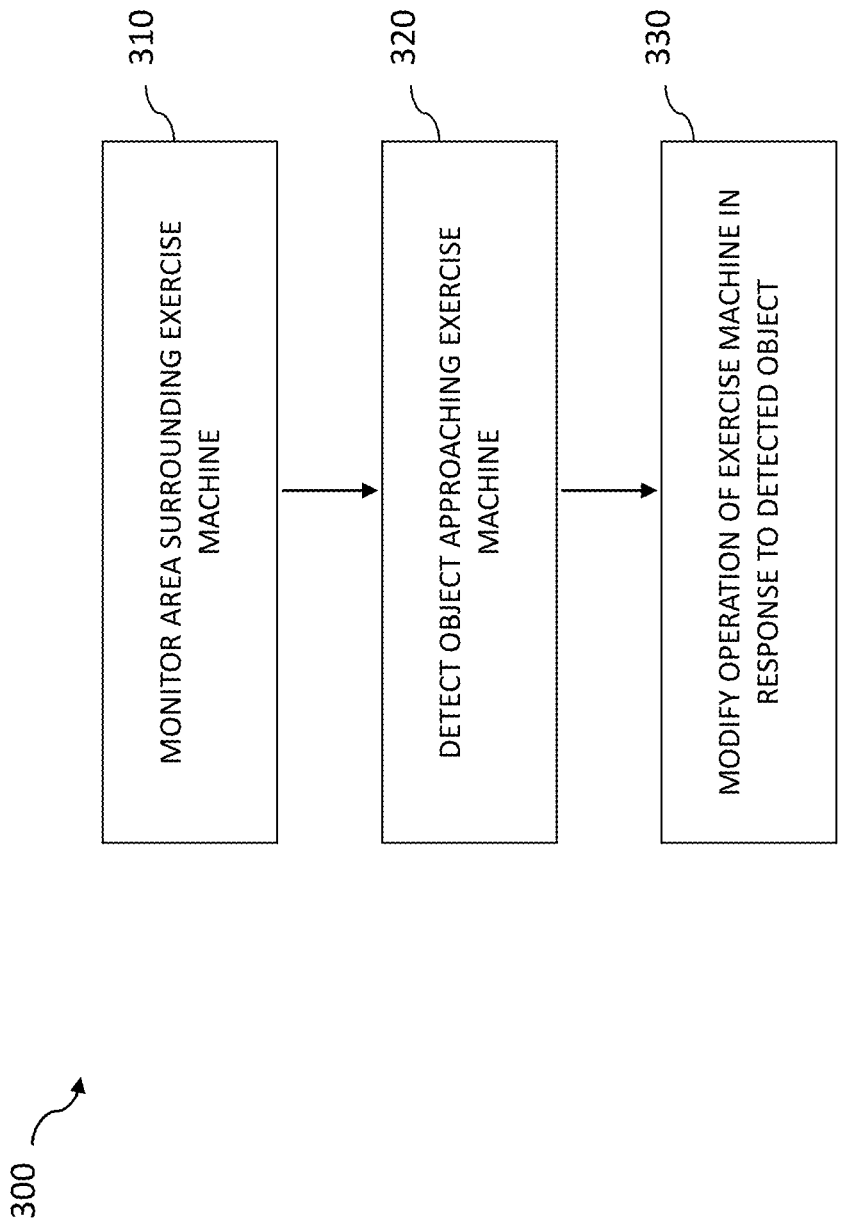
FIG. 3 is a flow diagram illustrating an example method for controlling operations of an exercise machine.

As described herein, the machine control system 200 performs methods and processes to monitor the proximity of an exercise machine and perform actions to modify the operations of the exercise machine. FIG. 3 is a flow diagram illustrating an example method 300 for controlling operations of an exercise machine. The method 300 may be performed by the machine control system 200 and, accordingly, is described herein merely by way of reference thereto. It will be appreciated that the method 300 may be performed on any suitable hardware.

In operation 310, the machine control system 200 monitors an area surrounding an exercise machine. For example, the object detection module 202 can receive or access information captured by the one or more sensors 210A-C that are monitoring an area surrounding the exercise machine.

In operation 320, the machine control system 200 detects an object proximate to or approaching the exercise machine. For example, the object detection module 202 can determine that the object is within a rear area of the exercise machine (e.g., the exercise machine 100) and/or determine that the object is moving towards a rear area of the exercise machine at a certain rate of speed and/or at a certain angle towards the machine.

In operation 330, the machine control system 200 modifies operation of the exercise machine in response to the detection of the object. For example, the operation modification module 204 performs an action to control a mechanical operation of the exercise machine, such as by transmitting instructions to the controller 220 or control system of the exercise machine.

As another example, the module 204 causes the UI 230 of the exercise machine (e.g., a display of the machine) to present an alert, warning, message, or other notification that identifies the object and/or possible modification operations. The presented information can be visual, aural, haptic, and so on.

As described herein, the actions can be based on certain detection conditions being met or satisfied. For example, the module 204 can present a warning or alert when an object is detected within a certain proximity of the machine within a certain duration, and then cause the machine to stop its movement when the object is within the certain proximity for a duration greater than a threshold duration.

Figure 4:
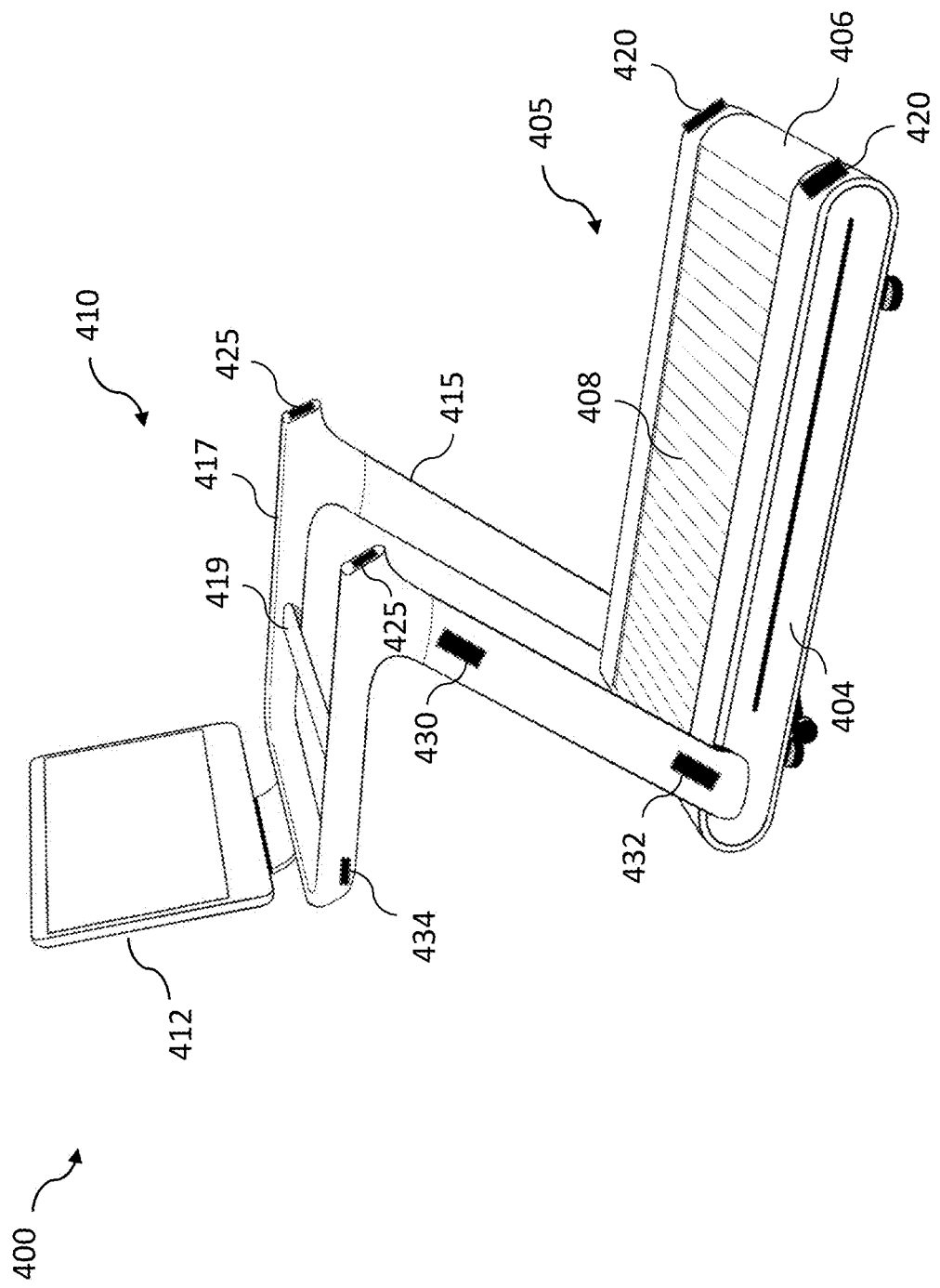
FIG. 4 is a diagram illustrating a positioning of detection sensors on a frame of a treadmill.

As described herein, the exercise machine can have sensors (e.g., sensors 120 and/or sensors 210A-C) disposed or positioned at multiple different locations of the machine. FIG. 4 is a diagram illustrating a treadmill 400 having detection sensors at different positions, to monitor different areas of the treadmill 400. As depicted, the sensors or cameras can be placed on arms or other support structures, on rear areas or deck areas of the treadmill, and so on.

The treadmill 400 includes a lower assembly 405 having a deck 404 that supports a belt 406 (or slatted surface) to move around the deck 404. The belt 406 provides a running surface 408 upon which a user runs, walks, or otherwise contacts the treadmill 400. For example, the running surface 408 of the belt 406 is a section of the belt 406 that is above or disposed upon a top of the deck 404 when the belt 406 moves around the deck 404.

The lower assembly 405 supports an upper assembly 410. The upper assembly 410 includes multiple sidewalls 415 (which can include multiple arms 417) that support a display 412 and various controls (e.g., rotary or button controls) of the treadmill 400. A cross bar 419 extends and is disposed between the sidewalls 415, such as via the arms 417.

Further details regarding suitable treadmills or other exercise machines that can incorporate or utilize the technology described herein can be found in U.S. patent application Ser. No. 17/346,166, filed on Jun. 11, 2021, entitled EXERCISE MACHINE CONTROLS, which is hereby incorporated by reference in its entirety.

The treadmill 400 supports one or more object detection sensors (e.g., the sensors 210A-C) at various locations or positions on the lower assembly 405 or the upper assembly 410. The deck 404 can include sensors 420, which have a FOV of a rear area of the treadmill 400 (e.g., disposed on end caps of the rear area of the deck 404 or on a rear guard fixed to the rear area of the deck 404) as well as other sensors on the deck 404 to monitor side or front areas of the treadmill 400. Further, although not shown, the underside of the deck 404 can include sensors to monitor an under area of the deck 404.

The upper assembly 410 can include sensors 425 disposed on ends of the sidewalls 415 (e.g., on ends of the arms 417), or sensors 430 on outer surfaces of the sidewalls 415. Further, lower portions or sections of the sidewalls 415 can include sensors 432, such as sensors disposed to monitor the side areas or front areas of the treadmill 400. As described herein, the treadmill 400 can include different types of sensors, such as various combinations or arrays of different sensor types.

Figure 5A:
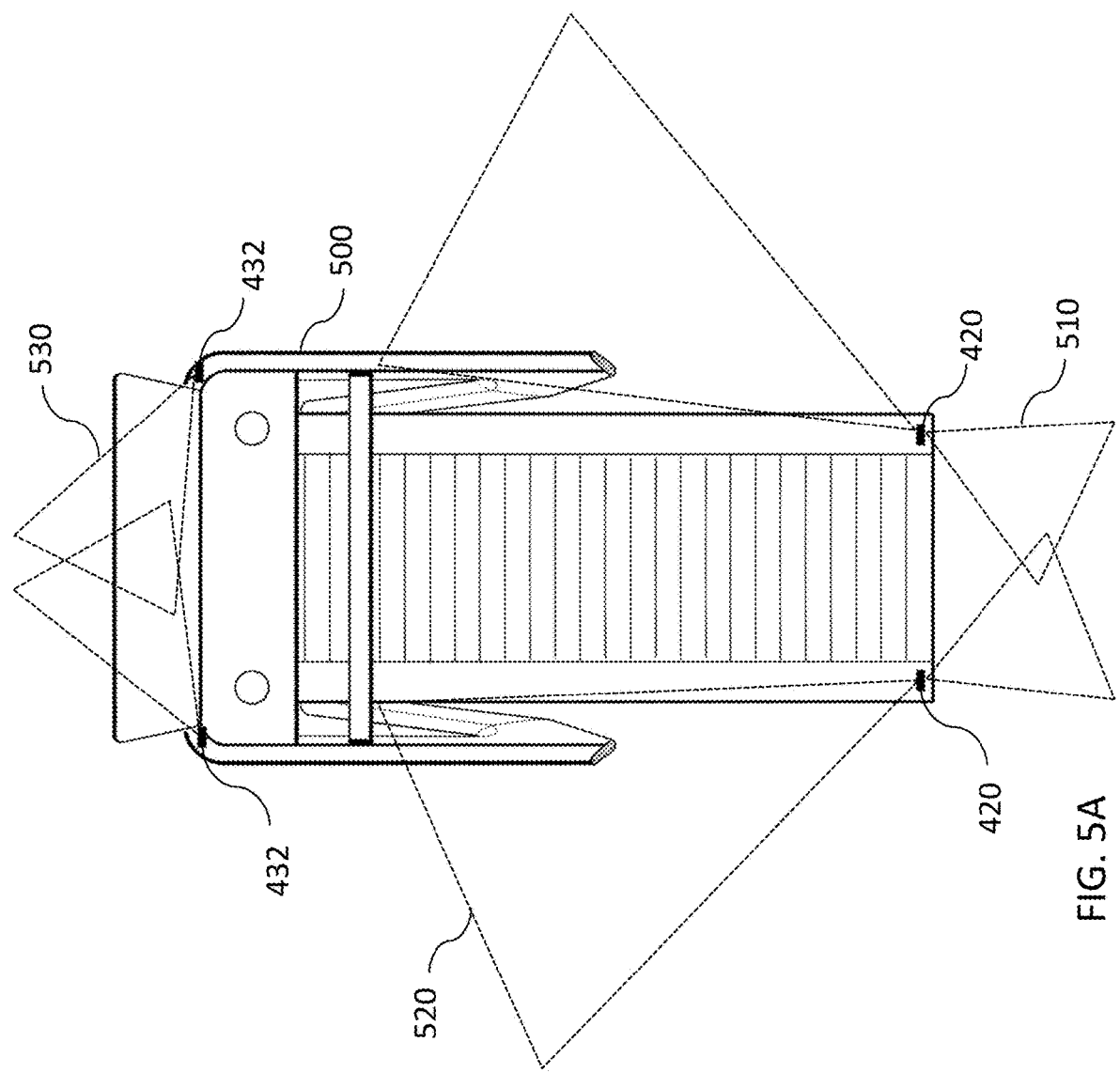
FIGS. 5A-5B are diagrams illustrating various detection proximities for exercise machines.

Further, an exercise machine deploys or positions sensors to monitor different areas proximate to the machine. For example, FIG. 5A depicts a treadmill 500 having sensors (e.g., the sensors 420 and 432) to monitor a rear area 510, side areas 520, and a front area 530 of the treadmill 500. Thus, the treadmill 500 can position, orient, and/or configure one or more sensors to capture objects within a 360-degree view around the treadmill 500.

Figure 5B:
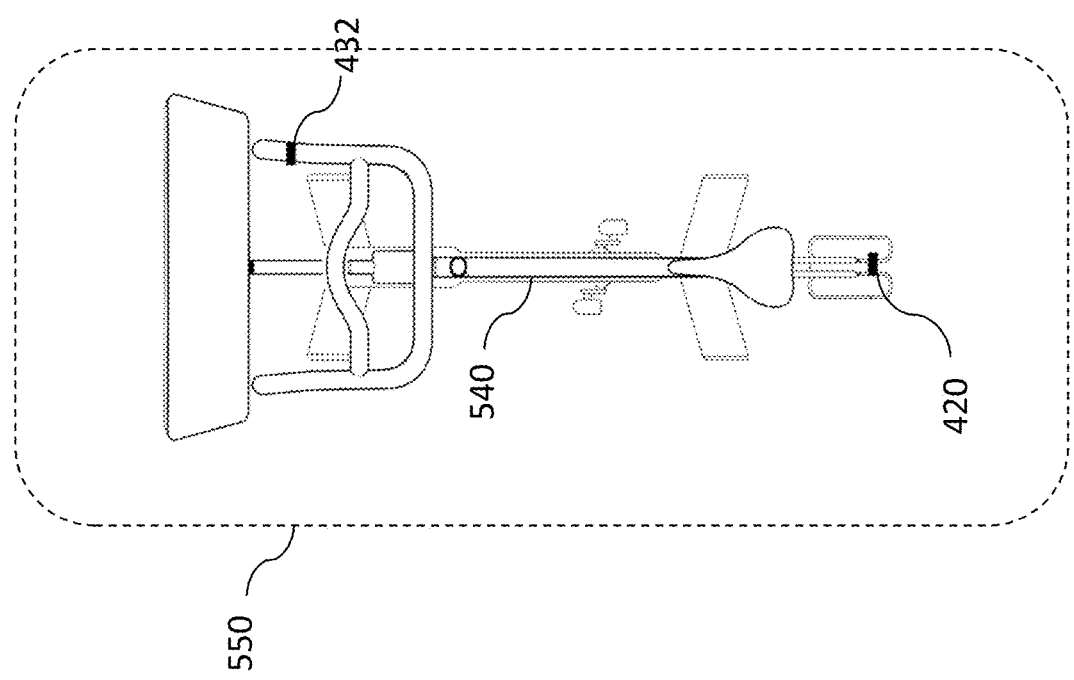

As another example, FIG. 5B depicts an exercise bicycle 540 having sensors (e.g., the sensors 420 located on a rear area of the bicycle and the sensors 432 located on handlebars of the exercise bicycle 540). The positioning of the sensors provides the exercise bicycle 540 with a monitored proximity or area 550 that surrounds the exercise bicycle 540, which enables an associated control system (e.g., the machine control system 200) to detect objects that enter any location of the monitored area 550.

Thus, a treadmill can include a deck, a belt having a running surface that moves around the deck, and one or more sensors that detect an object is proximate to the treadmill. The sensors can be a first sensor that determines the object is proximate to the treadmill and a second sensor that determines the object is moving towards the treadmill.

Further, the treadmill can include the controller 220, such as a control circuit that is communicatively coupled to the one or more sensors and operates to modify a current operation of the treadmill based on the object being proximate to the treadmill, such as being proximate to a rear area of the treadmill.

As described herein, the machine control system 200 can utilize two or more different sensors to provide multiple levels of monitoring. For example, the system 200 can utilize ToF sensors to continuously monitor a proximity of a machine, because the ToF sensors are not resource or processor intensive and can provide an initial layer of detection at low cost to resources. Once the ToF sensors detect an object, the system 200 can utilize other sensors that utilize more processor resources (e.g., mmWave or CV technologies) to characterize or determine additional information about detected objects, such as movement or motion information.

Figure 6:
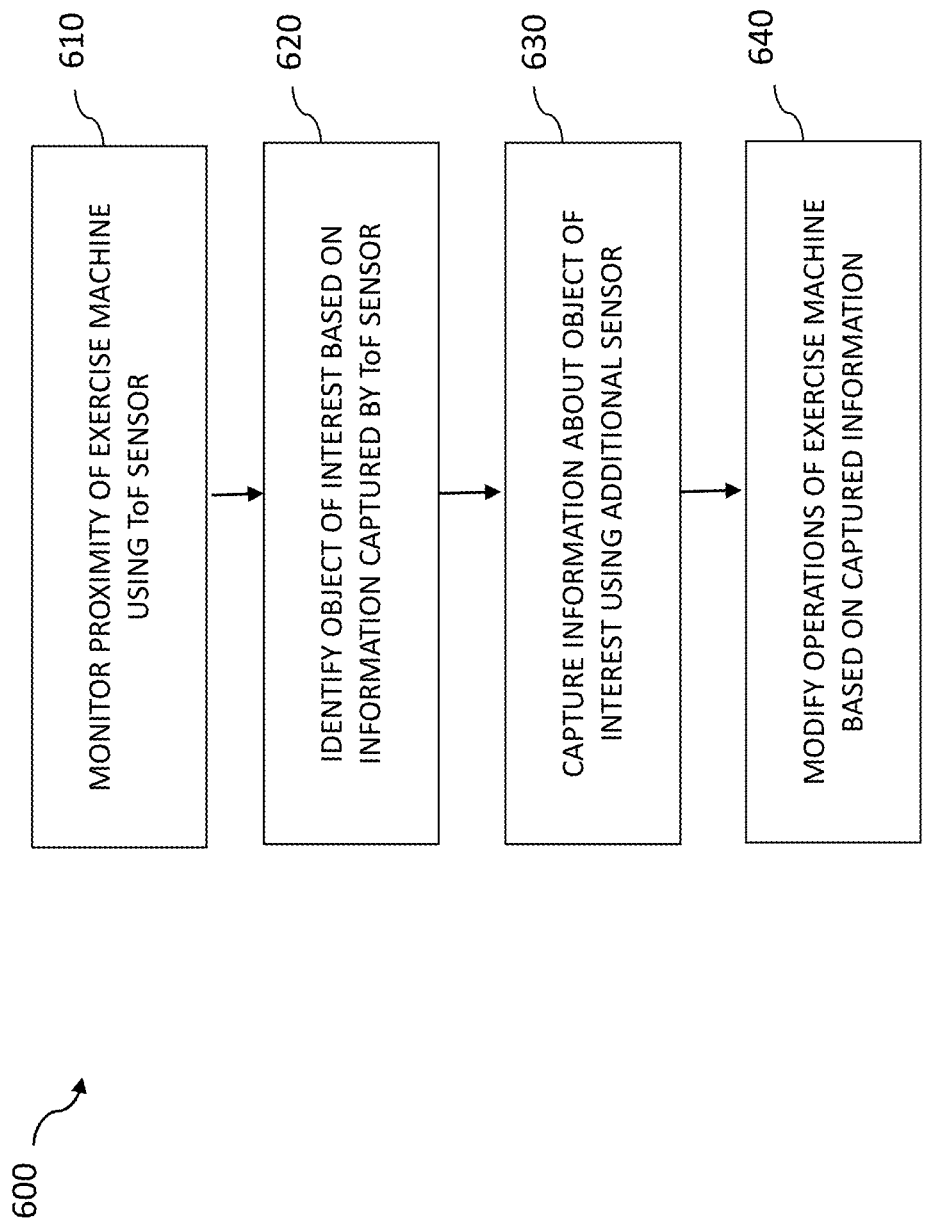
FIG. 6 is a flow diagram illustrating an example method for controlling operations of an exercise machine using different sensors.

FIG. 6 is a flow diagram illustrating an example method 600 for controlling operations of an exercise machine using different sensors. The method 600 may be performed by the machine control system 200 and, accordingly, is described herein merely by way of reference thereto. It will be appreciated that the method 600 may be performed on any suitable hardware.

In operation 610, the machine control system 200 monitors a proximity of an exercise machine using a first sensor, such as a ToF sensor. In operation 620, the machine control system 200 identifies an object of interest based on the information captured by the first sensor. For example, the system 200 utilizes information captured by one or more ToF sensors to determine whether an object is within a certain proximity to the machine, such as within a certain range or distance from the machine.

In operation 630, the machine control system 200 captures information about the object using an additional sensor. For example, the system 200 causes one or more other sensors (e.g., CV sensors, mmWave sensors, other ToF sensors of the machine) to capture information that identifies the object, identifies a size of shape of the object, identifies movement information about the object, identifies a motion state for the object, and so on.

In operation 640, the machine control system 200 modifies operations of the exercise machine based on the captured information. For example, the system 200 determines an object is moving towards the machine at a certain rate of speed, and slows down movement of the machine (e.g., movement of a belt on a treadmill or rotation of a flywheel on an exercise bicycle).

For example, a treadmill, such as the treadmill 400, can receive, from a first sensor of the treadmill, an indication that an object is proximate to a rear area of the treadmill, cause a second sensor of the treadmill to capture information that identifies a motion state of the object that is proximate to the rear area of the treadmill, and modify operations of the treadmill based on the identified motion state of the object. In some cases, the first sensor is a ToF sensor that detects a distance between the object and the rear area of the treadmill, and the second sensor is a computer vision (CV) sensor that determines, from multiple images captured of the object, that the motion state indicates the object is moving towards the rear area of the treadmill.

The motion state can include different parameters associated with the object at any given moment in time, such as a position/velocity of the object, a position/angle of movement of the object, a position/acceleration of the object, a velocity/angle of movement of the object (or just velocity of the object, and so on).

Thus, using the systems and methods described herein, an exercise machine can deploy different sensor types to monitor areas surrounding the machine and perform mitigation actions when object enters the monitored areas and causes a potential or actual dangerous condition or event, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the technology may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:
1. A treadmill, comprising:
a deck;
a belt having a running surface that moves around the deck; and
multiple sensors, including:
a time-of-flight sensor that detects an object is within an area surrounding the treadmill; and
a computer vision (CV) sensor that determines the object detected to be within the area surrounding the treadmill is moving towards the treadmill by identi- fying, within captured images of the detected object, a size and color of the detected object.

2. The treadmill of claim 1, wherein the multiple sensors are part of a computer vision system that identifies the object within one or more images captured of the area surrounding the treadmill.

3. The treadmill of claim 1, further comprising:
a control circuit that is communicatively coupled to the multiple sensors and operates to modify a current operation of the treadmill based on the object being proximate to the treadmill and based on determining that the object is moving towards the treadmill.

4. The treadmill of claim 1, wherein the one or more multiple sensors are disposed on a rear area of the deck of the treadmill.

5. A method performed by a controller of a treadmill, the method comprising:
receiving, from a first sensor of the treadmill, an indication that an object is proximate to a rear area of the treadmill;
causing, in response to receiving the indication, a second sensor of the treadmill to capture information that identifies a motion state of the object based on determining a size and color of the object; and modifying operations of the treadmill based on the identified motion state of the object.

6. The method of claim 5, wherein modifying operations of the treadmill based on the identified motion state of the object includes stopping movement of a running surface of the treadmill.

7. The method of claim 5, wherein the first sensor is a time-of-flight (ToF) sensor that detects a distance between the object and the rear area of the treadmill; and wherein the second sensor is a computer vision (CV) sensor that determines, from multiple images captured of the object, that the motion state indicates the object is moving towards the rear area of the treadmill.

8. A treadmill, comprising:
a deck;
a belt having a running surface that moves around the deck; and
a computer vision system configured to:
capture images of objects within an area proximate to the treadmill;
detect an object within the captured images of the objects by creating a bounding box around the object based on contours within the captured images;
identify the detected object based on determining a size and color of the detected object; and
determine the identified object is of concern to operations of the treadmill based on the identification of the detected object.

9. The treadmill of claim 8, wherein the computer vision system further identifies the detected object based on a determined rate of speed of the detected object.

* * * * *